United States Patent
Bertsch

(10) Patent No.: US 7,240,669 B2
(45) Date of Patent: Jul. 10, 2007

(54) METHOD OF OPERATING AN INTERNAL COMBUSTION ENGINE WITH A DUAL FUEL INJECTION SYSTEM

(75) Inventor: Ulrich Bertsch, Burgstetten (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/363,528

(22) Filed: Feb. 27, 2006

(65) Prior Publication Data
US 2006/0169255 A1 Aug. 3, 2006

Related U.S. Application Data

(63) Continuation-in-part of application No. PCT/EP04/09381, filed on Aug. 21, 2004.

(30) Foreign Application Priority Data
Aug. 29, 2003 (DE) ................................ 103 39 854

(51) Int. Cl.
*F02B 43/00* (2006.01)
(52) U.S. Cl. .................... 123/527; 123/528; 123/559.1
(58) Field of Classification Search ................ 123/527, 123/528, 559.1, 27 GE, 525, 565, 304, 431, 123/575
See application file for complete search history.

(56) References Cited

U.S. PATENT DOCUMENTS

| | | | | |
|---|---|---|---|---|
| 3,568,650 A | * | 3/1971 | Albrich ..................... 123/559.1 |
| 4,440,137 A | * | 4/1984 | Lagano et al. ............... 123/525 |
| 4,471,742 A | * | 9/1984 | Kishi .......................... 123/274 |
| 4,614,168 A | * | 9/1986 | Batchelor ............... 123/27 GE |
| 5,201,298 A | * | 4/1993 | Shearn ........................ 123/514 |
| 5,228,423 A | | 7/1993 | Oikawa et al. |
| 5,355,854 A | * | 10/1994 | Aubee ......................... 123/431 |
| 5,806,490 A | * | 9/1998 | Nogi et al. ................... 123/435 |
| 5,887,574 A | * | 3/1999 | Smith ........................ 123/527 |
| 5,992,388 A | | 11/1999 | Seger |
| 6,032,617 A | * | 3/2000 | Willi et al. ............. 123/27 GE |
| 6,340,005 B1 | * | 1/2002 | Keast et al. ............ 123/27 GE |
| 6,371,091 B1 | * | 4/2002 | Benders et al. ............. 123/527 |
| 6,371,092 B1 | * | 4/2002 | Guglielmo et al. ......... 123/527 |
| 2002/0078918 A1 | * | 6/2002 | Ancimer et al. ............ 123/295 |
| 2002/0134362 A1 | * | 9/2002 | Deutsch ..................... 123/575 |
| 2002/0185086 A1 | * | 12/2002 | Newman et al. ............ 123/1 A |
| 2003/0140902 A1 | * | 7/2003 | Seifert et al. ............... 123/527 |
| 2004/0099255 A1 | * | 5/2004 | Criddle et al. .............. 123/565 |

FOREIGN PATENT DOCUMENTS

| | | | |
|---|---|---|---|
| EP | 1 128 053 | * | 2/2001 |
| EP | 1 170 490 | | 1/2002 |
| JP | 59-188037 | * | 10/1984 |

(Continued)

*Primary Examiner*—Hai Huynh
*Assistant Examiner*—Ka Chun Leung
(74) *Attorney, Agent, or Firm*—Klaus J. Bach

(57) ABSTRACT

In a method of operating an internal combustion engine by supplying a gaseous fuel from a gaseous fuel tank to a combustion air feed line in which a compressor is arranged to the engine, part of the gaseous fuel is added to the combustion air feed line upstream of the compressor so as to form an intense pre-mixture with the air in the compressor and additional fuel is added to the gas/air pre-mixture downstream of the compressor.

8 Claims, 1 Drawing Sheet

FOREIGN PATENT DOCUMENTS

| | | | |
|---|---|---|---|
| JP | 03 275968 | | 12/1991 |
| JP | 9-4487 | * | 1/1997 |
| JP | 11-223543 | * | 8/1999 |
| JP | 2000257511 | | 9/2000 |
| JP | 2001003774 | | 1/2001 |
| WO | WO 01/86126 | | 11/2001 |

* cited by examiner

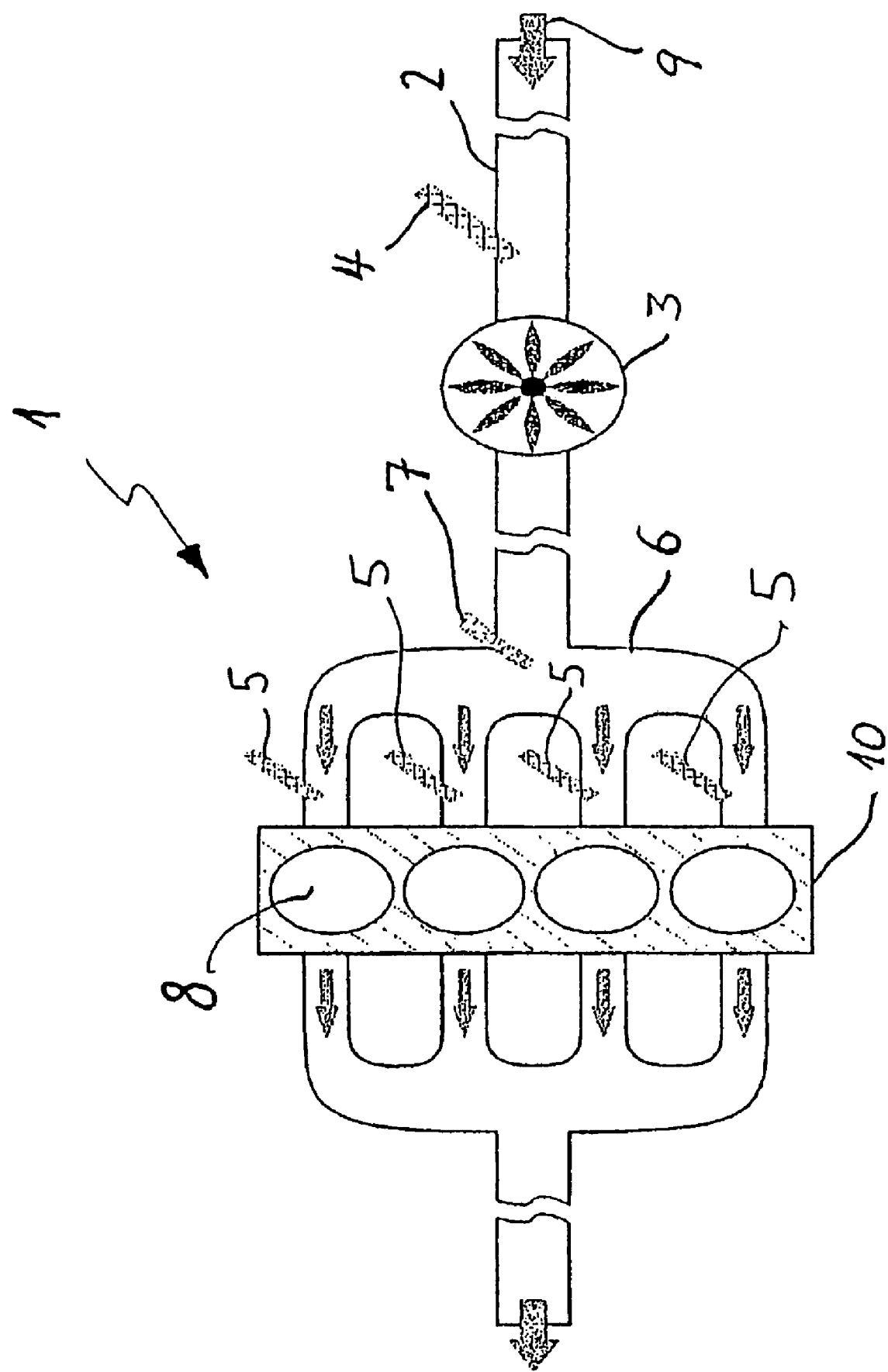

METHOD OF OPERATING AN INTERNAL COMBUSTION ENGINE WITH A DUAL FUEL INJECTION SYSTEM

This is a Continuation-In-Part Application of International Application PCT/EP2004/009381 filed 21 Aug. 2004 and claiming the priority of German application 103 39 854.6 filed 29 Aug. 2003.

BACKGROUND OF THE INVENTION

The invention relates to a method of operating a gaseous fuel internal combustion engine with a combustion air feed line which includes a compressor and a fuel supply line connected to the air feed line upstream of the compressor.

For the operation of modern internal combustion engines, gaseous fuels are also used in addition to the known liquid fuels in order to reduce consumption and emissions. Often, both, liquid and gaseous fuels are used at the same time, that is to say selectively, for bivalent operation.

When using gaseous fuels, in particular natural gas, a good mixture of the natural gas with combustion air is generally only conditionally obtainable because of the material properties of gaseous fuels, in particular at medium and high loads, due to displacement of the combustion air when large gas quantities are introduced which adversely affects mixing so that a desired gas/air mixture preparation is difficult to achieve. The conventional concepts for a gas operating mode often are based on an internal combustion engine operating on the gasoline or Diesel cycle, so that an optimized gas operating mode with good gas/air mixture preparation could only be realized to a limited extent.

DE 10008959 A1 discloses a gas engine in which, to obtain intensive mixing of the gas and the combustion air, a gas mixing device is provided in the form of a venturi mixer. Here, an axially displaceably mounted streamlined control element is arranged in a venturi pipe and, in addition, an insert consisting of a microporous material is inserted in the region of the narrowest point of the venturi pipe. The gas is fed into said micro-porous material via feed lines, and exits the micro-porous material for mixing in the narrowest region of the venturi pipe with the combustion air flowing through the pipe. The gas is admixed to the combustion air by means of a large-area mixing insert.

EP 1170490 A2 discloses a gas-operated internal combustion engine in which a turbocharger is arranged at the exhaust side and a compressor and a blow-off valve are arranged in the intake system. The air/gas mixture is prepared upstream of the compressor in an air/gas mixer and is compressed by the turbocharger. In the region of the blow-off valve, a pressure sensor is provided for detecting the mixture pressure providing a signal by which the mixture pressure is to be adapted as a function of load via a closed-loop control device by controlling the blow-off valve, in such a way that a loss of charge pressure is prevented during a load change. It has however been found that the concepts presented are not suitable for good mixture preparation.

It is an object of the present invention to provide a method in which improved mixture preparation is obtained using simple measures.

SUMMARY OF THE INVENTION

In a method of operating an internal combustion engine by supplying a gaseous fuel from a gaseous fuel tank to a combustion air feed line in which a compressor is arranged to the engine, part of the gaseous fuel is added to the combustion air feed line upstream of the compressor so as to form an intense pre-mixture with the air in the compressor and additional fuel is added to the gas/air pre-mixture downstream of the compressor.

In the method according to the invention wherein, in an internal combustion engine, a first fuel blow-in valve is arranged upstream of a compressor, a gas/air pre-mixture is formed within a combustion air feed line by means of the first fuel blow-in valve, at least one second fuel blow-in valve being additionally arranged in an intake pipe device, by means of which an additional gaseous fuel quantity is introduced.

The positioning of the first fuel blow-in valve upstream of the compressor results in a good mixture of the gaseous fuel with the combustion air since the gaseous fuel is whisked and intensively mixed with the combustion air by the compressor wheel. Since the small gas quantity which is supplied later is blown into a gas/air mixture which has already been well homogenized, a good mixture is likewise obtained here.

In a particular embodiment of the method according to the invention, a specific gas/air ratio is set as a function of load by means of the fuel quantity which is introduced by the second fuel blow-in valve. The mixture preparation can be optimized in this way. The fuel quantities introduced can for example be distributed as a function of the rotational speed of the compressor. The second fuel blow-in valve is preferably arranged in the intake pipe device upstream of an intake pipe fork.

According to a further embodiment of the method according to the invention, the fuel quantity which is introduced by the first fuel blow-in valve is metered as a function of load. As a result, the gas/air ratio of the gas/air pre-mixture can likewise be varied as a function of load.

In another further embodiment of the invention, one second fuel blow-in valve is provided per cylinder in an inlet region of the intake pipe device, so that a specific gas/air ratio is set for each cylinder. The fuel quantity which is additionally introduced by the second blow-in valve is then metered or varied selectively for each cylinder, so that the open-loop or closed-loop control of the gas/air ratio can be adapted to the load shortly before the gas/air mixture enters a combustion chamber of the respective cylinder.

According to still another further embodiment of the method according to the invention, the internal combustion engine has a second fuel tank, in which liquid fuel is stored, so that the internal combustion engine can optionally be operated with the liquid fuel. Bivalent operation is thus made possible.

The invention will become more readily apparent from the following description of an exemplary embodiment of the invention which is illustrated in a simplified manner in the drawing and is described in more detail in the following description.

BRIEF DESCRIPTION OF THE DRAWINGS

The sole FIGURE is a simplified schematic illustration of an internal combustion engine which is operated with gaseous fuel.

DESCRIPTION OF AN EXEMPLARY EMBODIMENT

The FIGURE shows an internal combustion engine 1 operated by gaseous fuel wherein a compressor 3 is arranged in a combustion air feed line 2. The combustion air feed line 2 extends to an intake pipe device that is a manifold 6 in which the supplied combustion air 9 is distributed to the various cylinders 8 of the internal combustion engine 1. The supplied combustion air 9 is of course distributed to two intake pipe devices if there is more than one cylinder bank 10, for example in an internal combustion engine in a V-formation.

For the supply of fuel, a first fuel blow-in valve 4 is arranged upstream of the compressor 3 and second fuel blow-in valves 5 are provided per cylinder, which fuel blow-in valves 5 are positioned in the inlet region of the intake pipe device 6. In the present exemplary embodiment, four fuel blow-in valves 5 are provided, this number only being an example and varying depending on the number of cylinders present. It is however conceivable that only one second fuel blow-in valve 5 is provided within the intake pipe device, upstream of the intake manifold, per cylinder bank 10.

According to the present invention, a gaseous fuel is introduced into the combustion air feed line 2 by the first fuel blow-in valve 4, so that a gas/air premixture is formed. The quantity introduced can be varied preferably as a function of load. The intense mixing in the compressor 3 and the long paths to the cylinder 8 result in intense homogenization.

In the cylinder inlet region, the pre-mixture is enriched with a further gaseous fuel quantity, so that a required gas/air ratio is obtained at the instantaneous operating point. It is conceivable that at low load, for example at idle, the gaseous fuel is introduced by means of port injection by the second fuel blow-in valve 5 without forming a pre-mixture.

Since the pre-mixture is further enriched by means of a small fuel quantity, that is to say a reduced quantitative flow in comparison to previous concepts, the second fuel blow-in valve 5 can preferably be smaller than the first blow-in valve 4. The use of small blow-in valves 5 requires a small amount of installation space, so that the intake pipe device 6 can be small in the region of a cylinder head.

It is conceivable to provide a charge-air cooling device (not illustrated) between the compressor 3 and the intake manifold 6, which charge-air cooling device cools the previously formed and compressed pre-mixture. Increased charging can be obtained as a result, which has a highly advantageous effect on the efficiency of the internal combustion engine 1 in a gas operating mode, since charging losses can be minimized in this way. It is expedient that the fuel quantity introduced by the first fuel blow-in valve 4 can be metered as a function of load. In this way, the pre-mixture preparation can be optimized in particular as a function of the rotational speed of the compressor. In addition, the gas/air ratio can be set selectively for each cylinder by arranging the second fuel blow-in valve 5 in the inlet region of the cylinders, without the mixture preparation being adversely affected by the proximity of the blow-in valve 5 to the cylinder inlet region.

In addition, bivalent operation of the internal combustion engine 1 is conceivable. According to this, either liquid or gaseous fuel is used selectively, it being possible for the liquid fuel to be, for example, a Diesel or gasoline fuel. The gaseous fuel is compressed natural gas, the use of another gaseous fuel being possible however.

In order to permit bivalent operation, a fuel injector 7, by means of which liquid fuel can be injected, is situated at the end of the combustion air feed line 2. The fuel injector 7 for injecting the liquid fuel is expediently provided at a point in the intake pipe device from which all the cylinders or each cylinder bank can be supplied with a combustible fuel/air mixture. In a gasoline or Diesel fuel operating mode, the liquid fuel is injected by the fuel injector 7 into an initial part of the intake pipe device 6 upstream of the fork. It is however conceivable that a plurality of fuel injectors 7, that is to say one per cylinder, are provided in the inlet region of the cylinders 8. Alternatively, the fuel injectors 7 can be arranged in the cylinder head of the internal combustion engine 1 in such a way that the fuel can be injected directly into the combustion chamber.

The design and the method of operation of fuel injectors and blow-in valves are sufficiently known to a person skilled in the art. They can for example be piezo-electrically operated or solenoid-operated injectors or blow-in valves.

Both a first fuel tank for the gaseous fuel and a second fuel tank for the liquid fuel are provided for bivalent operation of the internal combustion engine. The invention relates in particular to an internal combustion engine which is preferably operated with a gaseous fuel, it alternatively being operated in emergencies or selectively with liquid fuel.

According to an advantageous embodiment of the method according to the invention, operation is switched between a gaseous fuel operating mode and a liquid fuel operating mode as a function of a filling degree of the first fuel tank for the gaseous fuel. As a result, the operating mode of the internal combustion engine 1 can, in emergencies, be switched for example to Diesel or gasoline fuel. An emergency fuel tank is particularly advantageous in countries or regions having a limited number of gas filling stations in case the gaseous fuel is unexpectedly used up.

The present invention is suitable for all internal combustion engines which are operated with gaseous or liquid fuel on a 4-stroke or a 2-stroke cycle. It is also conceivable to use it both in spark-ignition and in compression-ignition internal combustion engines, for example for Diesel/natural gas or Diesel/liquefied gas fuel combinations. In addition, the method according to the invention can be applied to all mono-valently-operated internal combustion engines which are operated, for example, using only natural gas or liquefied gas.

What is claimed is:

1. A method of operating a gaseous fuel internal combustion engine (1) having a cylinder bank (10) with at least one cylinder (8) a manifold (6) connected to each cylinder bank for conducting combustion air to each cylinder (8), a combustion air feed line (2) connected to the manifold (6) and a compressor (3) disposed in the combustion air feed line (2) for compressing the combustion air supplied to the engine (1), the method comprising the steps of introducing gaseous fuel from a gaseous fuel tank in an amount smaller than required for combustion with the combustion air in the internal combustion engine to the combustion air in the feed line (2) upstream of the compressor (3) for a thorough mixture in the compressor with the combustion air, and introducing an additional amount of fuel to the combustion air-gaseous fuel mixture downstream of the compressor (3) and upstream of the cylinders (8) of the internal combustion engine (1) the relative fuel amounts being determined as a function of the rotational speed of the compressor (3).

2. The method according to claim 1, wherein liquid fuel can be injected into the combustion air downstream of the compressor 3 at least in addition to the gaseous fuel supplied to the feed line (2) upstream of the compressor (3) so that engine operation can optionally at least be supported by liquid fuel taken from a liquid fuel tank which is separate from the gaseous fuel tank.

3. The method according to claim 2, wherein engine operation is switched between a gaseous fuel operating mode and a liquid fuel operating mode as a function of a fuel amount left in the gaseous fuel tank.

4. The method according to claim 3, wherein at least one liquid fuel injector (7) is provided in the feed pipe (2) upstream of the manifold branches and the liquid fuel is injected into the combustion air when switching to a liquid fuel operating mode.

5. The method as claimed in claim 1, wherein the cylinder bank includes a plurality of cylinders and the manifold includes branches leading to the individual cylinders (8) and the additional amount of fuel is injected into the branches leading to the individual cylinders (8) so that a specific individual gas/air ratio is set for each cylinder (8).

6. The method according to claim 5, wherein a specific desired gas/air ratio is determined as a function of the engine load and the amount of additional fuel introduced into the manifold branches is controlled so as to obtain the desired gas/air ratio.

7. The method as claimed in claim 1, wherein the additional amount of fuel is introduced into the feed line (2) upstream of any branch ducts of the manifold (6).

8. The method according to claim 1, wherein the quantity of gaseous fuel introduced into the feed line (2) upstream of the compressor (3) is determined also as a function of engine load.

* * * * *